United States Patent
Kusakabe

(10) Patent No.: US 9,699,329 B2
(45) Date of Patent: Jul. 4, 2017

(54) INFORMATION PROCESSING APPARATUS AND INFORMATION PROCESSING METHOD FOR NOTIFYING THAT A FILE IS BEING MOVED

(71) Applicant: CANON KABUSHIKI KAISHA, Tokyo (JP)

(72) Inventor: Yuki Kusakabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/957,466

(22) Filed: Dec. 2, 2015

(65) Prior Publication Data

US 2016/0165074 A1    Jun. 9, 2016

(30) Foreign Application Priority Data

Dec. 4, 2014  (JP) ................. 2014-246338

(51) Int. Cl.
| | |
|---|---|
| *G06F 3/12* | (2006.01) |
| *H04N 1/00* | (2006.01) |
| *G06F 17/30* | (2006.01) |
| *H04N 1/32* | (2006.01) |
| *H04N 1/41* | (2006.01) |
| *G06K 15/00* | (2006.01) |

(52) U.S. Cl.
CPC ... *H04N 1/00204* (2013.01); *G06F 17/30079* (2013.01); *G06F 17/30115* (2013.01); *H04N 1/0032* (2013.01); *H04N 1/00413* (2013.01); *H04N 1/00477* (2013.01); *H04N 1/32358* (2013.01); *H04N 1/41* (2013.01); *H04N 2201/0094* (2013.01)

(58) Field of Classification Search
CPC ............. H04N 1/00204; H04N 1/0032; H04N 1/00413; H04N 1/00477; H04N 1/32358; H04N 1/41; H04N 2201/0094; G06F 17/30079; G06F 17/30115; G06F 17/30144
USPC .................................................. 358/1.1–1.18
See application file for complete search history.

(56) References Cited

U.S. PATENT DOCUMENTS

| | | | |
|---|---|---|---|
| 8,176,105 B2* | 5/2012 | Kusko | ............... G06F 17/30067 707/693 |
| 2008/0306900 A1 | 12/2008 | Tamura | |
| 2010/0024011 A1* | 1/2010 | Fukuoka | ........... G06F 17/30011 726/5 |

(Continued)

*Primary Examiner* — Gabriel Garcia
(74) *Attorney, Agent, or Firm* — Canon U.S.A. Inc., IP Division

(57) ABSTRACT

When provision of a movement instruction for moving a file stored in a first folder to a second folder is detected, whether exclusion processing is already performed for the file is determined. In a case where it is determined that the exclusion processing is not performed for the file, the exclusion processing is performed so that the file to be operated by another user is not allowed and information indicating that the file is being moved is stored. After the file is moved to the second folder, the exclusion processing for the file is canceled. In a case where it is determined that the exclusion processing has already been performed for the file and when the information indicating that the file is being moved is stored for the file for which the exclusion processing has been performed, a notification indicating that the file is being moved is provided.

9 Claims, 10 Drawing Sheets

(56) References Cited

U.S. PATENT DOCUMENTS

| | | | |
|---|---|---|---|
| 2010/0138743 A1* | 6/2010 | Chou | G06F 3/0486 |
| | | | 715/702 |
| 2012/0191736 A1* | 7/2012 | Yamaguchi | G06F 17/30079 |
| | | | 707/756 |
| 2013/0262534 A1* | 10/2013 | Hayakawa | G06F 17/30115 |
| | | | 707/822 |
| 2015/0036184 A1* | 2/2015 | Hamaguchi | H04N 1/32363 |
| | | | 358/1.15 |

* cited by examiner

INFORMATION PROCESSING APPARATUS AND INFORMATION PROCESSING METHOD FOR NOTIFYING THAT A FILE IS BEING MOVED

BACKGROUND OF THE INVENTION

Field of the Invention

The present invention relates to display in moving a file.

Description of the Related Art

Paperless fax order-receiving/ordering work in trading companies and the like has been accelerated. In the paperless fax order-receiving/ordering work, the following workflow is performed. When a fax order is received from a customer, an image representing the received fax order is converted into a file (e.g., a file in general-purpose format, such as Portable Document Format (PDF) and Joint Photographic Experts Group (JPEG)), and this file is stored into a shared folder on a shared server. One of persons in charge subsequently moves the file from the shared folder to his/her own folder, and then edits a purchase order while referring to the file. This person then performs a process for placing an order with a manufacturer.

Moving a file between different servers is implemented as follows. First, a file in a movement origin server is copied into an information processing apparatus operated by a user, and then copied from the information processing apparatus onto a movement destination server. Upon completion of such copying, the file in the movement origin server is deleted. In other words, the file to be moved remains in the movement origin server, until completion of the copying to the movement destination server. During this process, another user can operate the file remaining in the movement origin server. In this way, unlike ordinary movement of a file within one server, there is a long time during which another can operate the file to be moved and remaining in the movement origin server. When such an operable time is long, one file may be operated by two or more information processing apparatuses, so that a conflict readily occurs between operations for moving a file to different information processing apparatuses. To address such a situation, exclusion processing is performed. In the exclusion processing, while a user operates a file, another user is not allowed to operate the file. In other words, during an operation for moving a file by a user, if another attempts to move this file, the exclusion processing is performed, so that an error notification indicating that the file attempted to be moved is not present (e.g., a notification saying "file not found") is provided to another user performing an operation later than the user.

In a case where an error notification indicating that a file attempted to be moved is not present (e.g., a notification saying "file not found") is provided to another user performing an operation later than the user, as in the above-described exclusion processing, there arises an issue in which it appears to another user that the file attempted to be moved is lost during the operation for moving the file.

Meanwhile, US2008/0306900 discusses a technique for keeping a deletion history and a movement history by monitoring file operations in a folder, and displaying the deletion history and the movement history in the folder when the folder is opened. In this technique, all operations performed in a folder are recorded and displayed.

In the above-described order-receiving/ordering workflow, a large volume of faxes is received and thus, the number of operations performed by each person in charge for moving a file from a shared folder to his/her own folder also increases. Therefore, if the technique of US2008/0306900 is applied to the above-described order-receiving/ordering workflow, it is difficult to find a file from a history by determining which file in the history corresponds to a file being operated at the time of occurrence of an error, because the volume of the history is too large.

SUMMARY OF THE INVENTION

According to an aspect of the present invention, an information processing apparatus includes a detection unit configured to detect provision of a movement instruction for moving a file stored in a first folder to a second folder, a first determination unit configured to determine whether exclusion processing is already performed for the file, an exclusion processing unit configured to perform, in a case where the first determination unit determines that the exclusion processing is not performed for the file, the exclusion processing for not allowing the file to be operated by another user and configured to store first information indicating that the file is being moved, a moving unit configured to move, in a case where the first determination unit determines that the exclusion processing is not performed for the file, the file to the second folder, a canceling unit configured to cancel, after the moving unit moves the file to the second folder, the exclusion processing for the file, and a notification unit configured to notify that the file is being moved, in a case where the first determination unit determines that the exclusion processing has been performed for the file and when the first information is stored for the file for which the exclusion processing has been performed.

Further features of the present invention will become apparent from the following description of exemplary embodiments with reference to the attached drawings.

DESCRIPTION OF THE EMBODIMENTS

Figure 1:
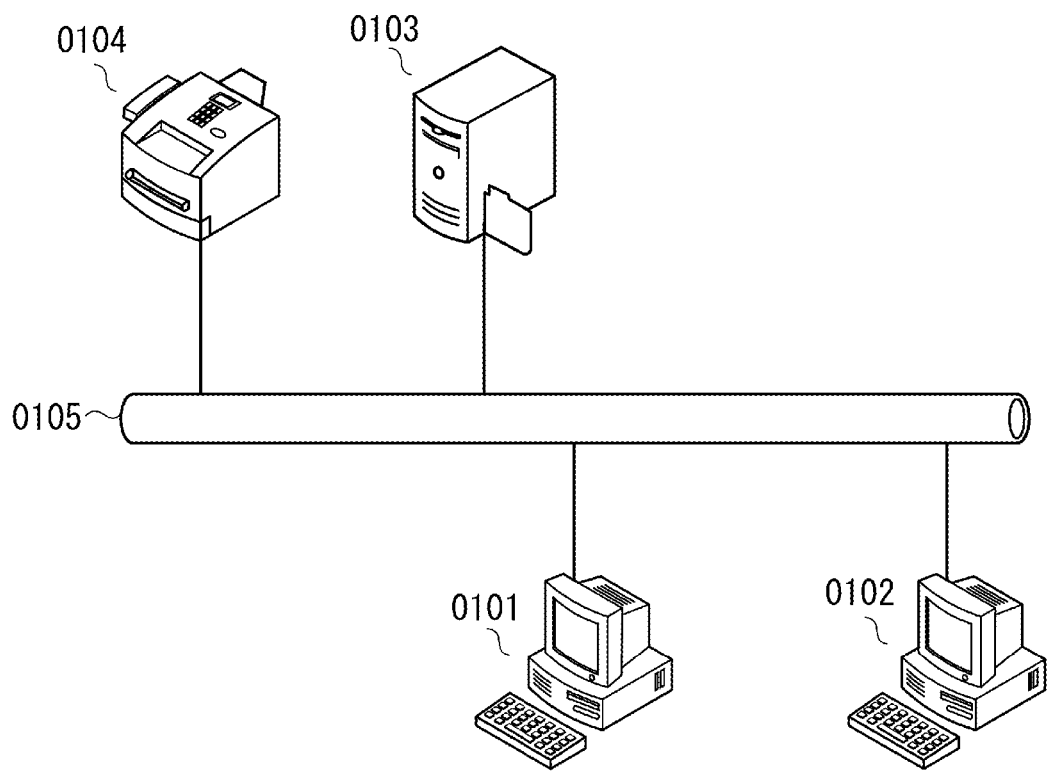
FIG. 1 is a diagram illustrating an overall configuration of an exemplary embodiment.

FIG. 1 is a diagram illustrating an overall configuration according to a first exemplary embodiment of the present invention. In FIG. 1, information processing apparatuses 0101 and 0102 are connected with a network 0105 that allows communication with a document management server 0103 and an image forming apparatus 0104.

Figure 2:
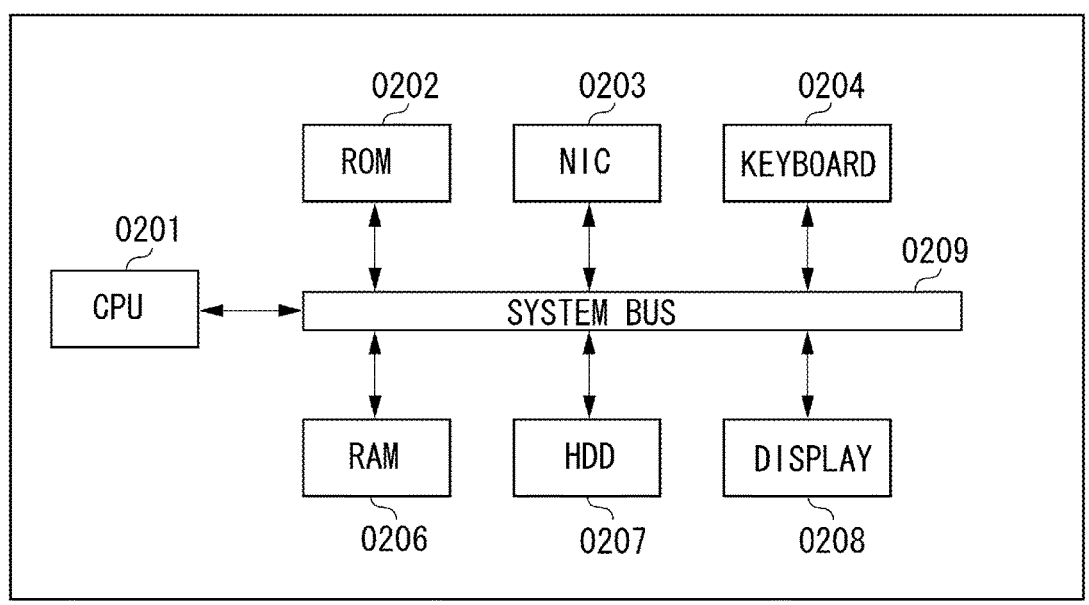
FIG. 2 is a block diagram illustrating a hardware configuration of an information processing apparatus.

FIG. 2 is a block diagram illustrating a hardware configuration example of each of the information processing apparatus 0101, the information processing apparatus 0102, and the document management server 0103 illustrated in FIG. 1. The document management server 0103 is an external apparatus capable of communicating with the information processing apparatuses 0101 and 0102, and may be a personal computer (PC).

A central processing unit (CPU) 0201 is a controller of each of the information processing apparatus 0101, the information processing apparatus 0102, and the document management server 0103. The CPU 0201 executes programs, such as an operating system (OS) and a document management application in the present exemplary embodiment, that are stored in a hard disk drive (HDD) 0207. The CPU 0201 performs control for temporarily storing information necessary for execution of a program, a file, and the like, into a random access memory (RAM) 0206. The CPU 0201 (a computer) of each of the information processing apparatuses 0101 and 0102 functions as each processing unit to be described below, by executing the document management application. Meanwhile, the CPU 0201 of the document management server 0103 executes a server program. A read only memory (ROM) 0202 is a storage unit provided to store programs, for example, a basic input/output (I/O) program, and various data, such as font data to be used for file processing and template data. A network interface card (NIC) 0203 is a network interface, via which the information processing apparatuses 0101 and 0102 each exchange data with an external apparatus.

A keyboard 0204 is an input device serving as an instruction input unit. The keyboard 0204 is provided so that a user inputs instructions, such as a control command to the document management application in the present exemplary embodiment, or inputs text. The RAM 0206 is a temporary storage unit, and functions as a main memory, a work area, and the like for the CPU 0201. The HDD 0207 is one of external storage units, and serves as a hard disk (HD) that functions as a large-capacity memory. The HDD 0207 stores document files, application programs, an operating system (OS), related programs, and the like. A display 0208 is an output device serving as a display unit, to display a command input from the keyboard 0204, a status of the document management application in the present exemplary embodiment, and the like. A system bus 0209 is provided to connect components in each of the information processing apparatus 0101, the information processing apparatus 0102, and the document management server 0103, and controls data flow in each of the information processing apparatus 0101, the information processing apparatus 0102, and the document management server 0103.

Figure 3:
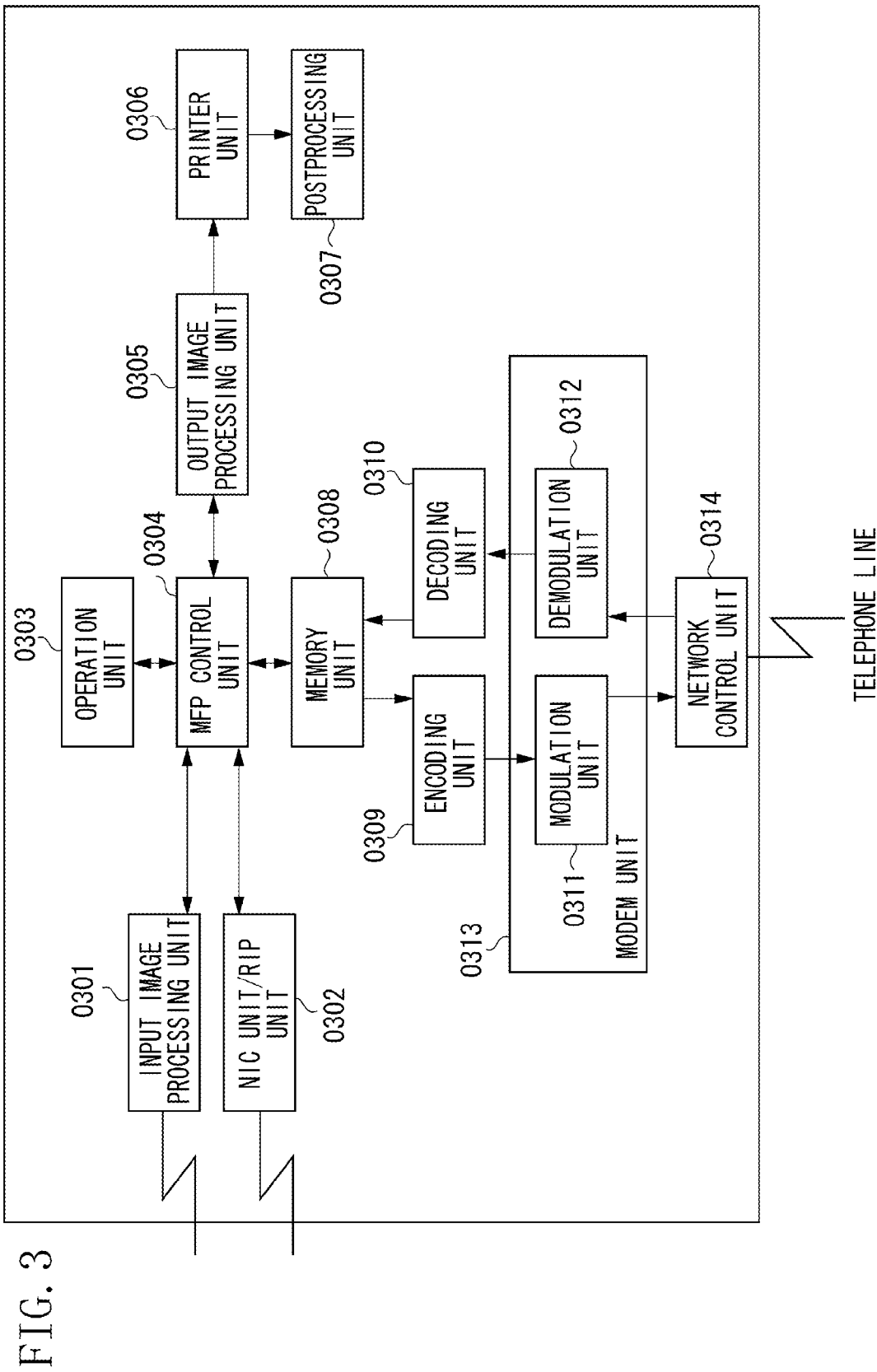
FIG. 3 is a block diagram illustrating a hardware configuration of an image forming apparatus.

FIG. 3 is a block diagram illustrating a hardware configuration of the image forming apparatus 0104 illustrated in FIG. 1. An input image processing unit 0301 performs image processing on image data obtained by reading a paper document with an image reading device, such as a scanner. A NIC unit 0302 transfers image data (mainly, page description language (PDL) data) input via a network, to a raster image processor (RIP) unit 0302. In addition, the NIC unit 0302 transmits image data and apparatus information in a multifunction peripheral (MFP), to outside via the network. The RIP unit 0302 performs conversion using a RIP, by decoding the input PDL data.

An operation unit 0303 is provided for selecting various flows and functions described above, or for receiving operation instructions. Resolution of display devices of operation units has been increased, whereby the operation unit 0303 can be used in such a way that image data in a memory unit is previewed on the operation unit 0303 and then printed when confirmed after being checked.

The input image data is sent to an MFP control unit 0304. The MFP control unit 0304 plays a role of traffic control for input data and data to be output. Further, the image data input into the MFP control unit 0304 is temporarily stored into a memory unit 0308. The temporarily stored image data is called as necessary.

An output image processing unit 0305 performs image processing for printing, and sends image data resulting from the image processing to a printer unit 0306. In the printer unit 0306, sheets are fed, and the image data generated in the output image processing unit 0305 is sequentially printed on the sheets. The sheets after printing are conveyed to a postprocessing unit 0307 that performs sheet sorting processing and sheet finish processing.

When fax transmission is performed, it is necessary to send an image signal (a digital signal) of a scanned original document, to a party at the other end of a telephone line (an analog line). Therefore, an encoding unit 0309 compresses (in general, using a run length method for compression/ decompression in a fax) a digital image signal of a raster image sent from the MFP control unit 0304, and then a modulation unit 0311 performs conversion from the digital signal to an analog signal. This conversion is referred to as "modulation". The analog signal is then sent to the telephone line via a network control unit 0314. In fax reception, it is necessary to convert an analog signal (a modulated signal) received via the telephone line, into a digital signal. Data input from the telephone line is received by the network control unit 0314, and then voltage conversion is performed. A demodulation unit 0312 subsequently performs analog-to-digital (A/D) conversion referred to as "demodulation". After the A/D conversion is performed, a decoding unit 0310 converts the data compressed by the run length method, into raster data. An image representing the raster data is temporarily held in the memory unit 0308, and then sent to the MFP control unit 0304 after confirmation of no transfer error in the image data. A device capable of performing both modulation and demodulation is referred to as a modulator and demodulator (MODEM) unit 0313. In the fax reception, the image received by the MFP control unit 0304 can be sent to the output image processing unit 0305, and then output on paper via the printer unit 0306. The image can also be converted into a general-purpose format or image format in the MFP control unit 0304, and then transmitted from the NIC unit 0302 to the document management server 0103 to be stored as a file. In the first exemplary embodiment, the received FAX document is converted into a general-purpose format or image format, and then stored in a specific folder in the document management server 0103.

Figure 4:
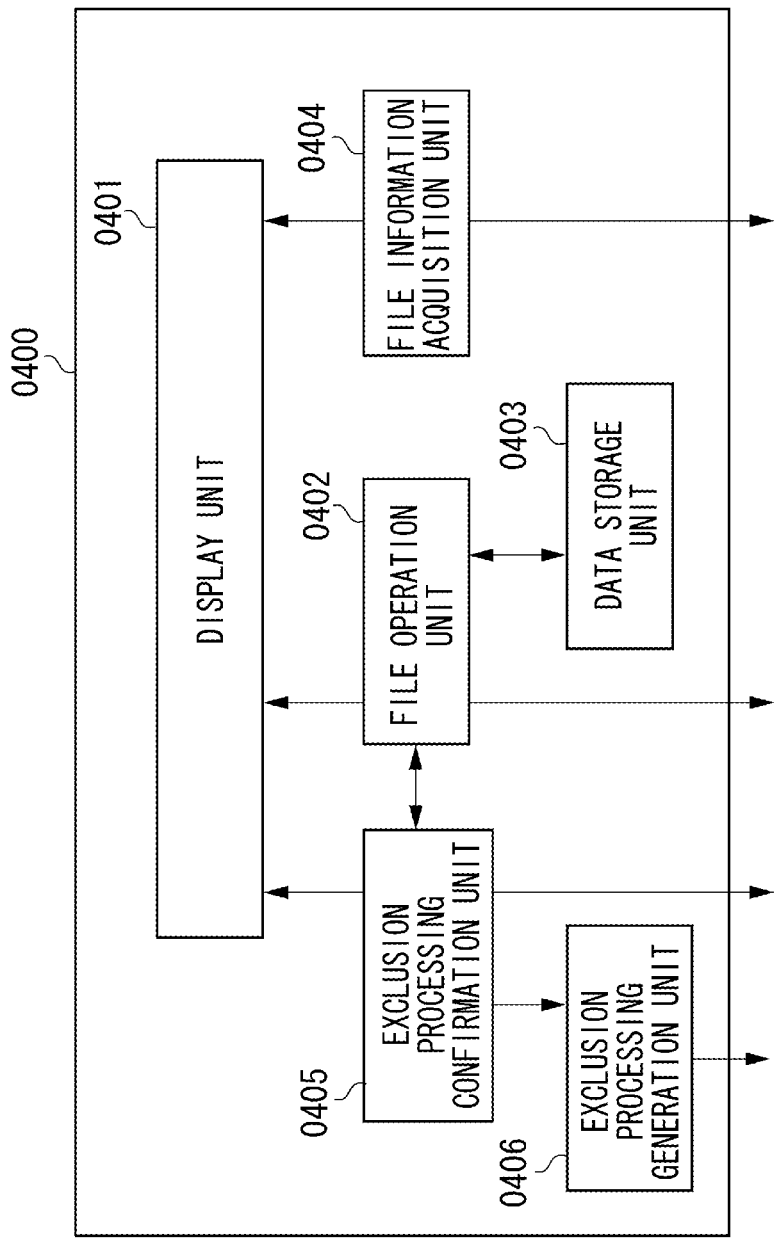
FIG. 4 is a diagram illustrating an example of a software configuration of a document management application.

FIG. 4 is a diagram illustrating an example of a software configuration of the document management application in the present exemplary embodiment. A document management application 0400 is a program module that runs in each of the information processing apparatuses 0101 and 0102, and is loaded into the RAM 0206 to be executed by the CPU 0201. The document management application 0400 refers to the document management server 0103 by using a file information acquisition unit 0404, and executes operations, such as moving and editing for a document by using a file operation unit 0402. When a file on the document management server 0103 is moved or edited, the file is temporarily stored in a data storage unit 0403. When a file is in a state where a conflict may occur, such as a state of being moved and a state of being edited, the file operation unit 0402 confirms with an exclusion processing confirmation unit 0405 whether the exclusion processing is already performed. If the exclusion processing is not performed, an exclusion processing generation unit 0406 executes the exclusion processing, and a file operation continues. If execution of the exclusion processing is confirmed with the exclusion processing confirmation unit 0405, the file operation is interrupted.

Figure 5:
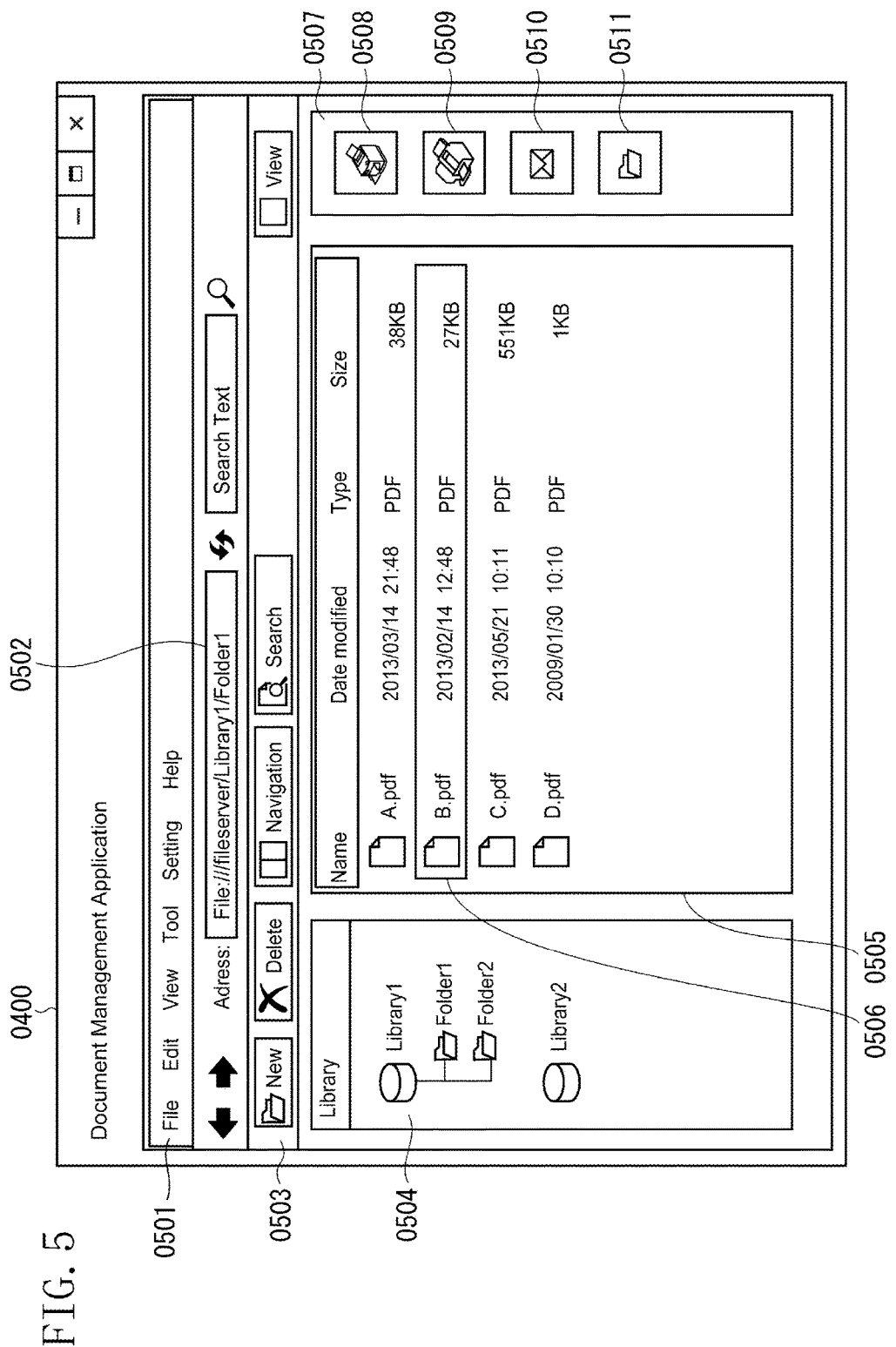
FIG. 5 is a diagram illustrating an example of a user interface (UI) of the document management application.

FIG. 5 illustrates an example of a user interface (UI) of the document management application 0400. A menu 0501 displays a list of operation execution commands for a folder or a document file. When a command is selected by the user, processing corresponding to the selected command is executed. An address bar 0502 displays the path of a folder currently being referred to. When the path of a folder is input into the address bar 0502, a file list view 0505 displays a list of document files included in the folder of the designated path.

A tool bar 0503 displays a shortcut button corresponding to an executable operation displayed in the menu 0501. Changing of display in the file list view 0505 from one to another is also performed with a button of the tool bar 0503. The file list view 0505 illustrated in FIG. 5 is in a form of list display. However, thumbnail display is also included, so that the file list view 0505 can be switched between the list display and the thumbnail display.

A navigation pane 0504 displays a list of registered libraries, and the location of the folder currently being referred to. One or more libraries can be registered. Displayable properties and operable functions vary among the registered libraries. This may be defined by a document management application, or may be defined by a file server. As for a relationship between the libraries and the folders, the libraries are in a higher hierarchical layer, while the folders are in a hierarchical layer below the layer of the libraries. Content set in a library is also applied to a folder belonging to the library.

The file list view 0505 displays a list of document files of a folder specified with a folder path displayed in the address bar 0502. A display mode is changed by switching the display designated in the tool bar 0503. In FIG. 5, the list display is illustrated as an example. A document file 0506 is an icon representing a file stored in the folder being referred to.

An output bar 0507 displays buttons registered in the output bar 0507. When one of the registered buttons is designated by the user, an action associated with the designated button can be executed for the document file 0506 selected in the file list view 0505. In the present exemplary embodiment, a print button 0508, a fax transmission button 0509, an email attachment button 0510, and an action button 0511 for movement to a folder can be registered in the output bar 0507. FIG. 5 illustrates an example of a UI in a state where these buttons are registered.

Next, a procedure of the document management application 0400 will be described using a flowchart of FIG. 6. In this procedure, in moving a file, the document management application 0400 determines whether movement of the file by a document management application in another information processing apparatus is being executed, and provides a notification indicating who is moving the file to where, if the movement of the file is being executed. Each step in this flowchart in the present exemplary embodiment is implemented when a program related to this flowchart is read into the RAM 0206, and then executed by the CPU 0201. In other words, this program causes a CPU (a computer) to function as each processing unit for executing a process in each step in FIG. 6.

In step S0601, the document management application 0400 detects provision of a movement instruction by a user for moving a file, which is selected in the file list view 0505, to a movement destination that is another folder (or another library). In other words, the document management application 0400 detects provision of a movement instruction by a user for moving a file stored in a folder of a movement origin to a second folder.

In step S0602, the exclusion processing confirmation unit 0405 of the document management application 0400 determines whether a lock file is present in the folder of the movement origin, to determine whether the exclusion processing is already performed on a target file (e.g., the document file 0506) in the movement origin. The lock file is a file (an exclusion processing determination file) serving as a mark for determining whether the exclusion processing is being executed. The lock file is created when an operation for moving a file is performed by a user. In other words, in the present exemplary embodiment, when an operation for moving a file is performed by a user, a lock file, which is provided with a name formed by combining the name of the operated file with an extension of ".~lock", is created. The created lock file is then stored into the same folder as a movement origin folder where the operated file is stored. Therefore, in determination of presence/absence of a lock file, whether this file is present may be determined by deriving a lock file name from the name of an operated file.

In a case where absence of a lock file is determined (No in step S0602), the operation proceeds to step S0603. In step S0603, since the file can be moved, the exclusion processing generation unit 0406 creates a lock file to exclude operations by another user, and arranges the created lock file in the folder of the movement origin. The created lock file is provided with a name formed by combining the file name of the operated file with ".~lock", as described above. In addition, a machine name, a domain name, a user name of the user executing this operation, and information about the movement destination are written to the created lock file. By creating the lock file and storing the created lock file in the movement origin folder, the exclusion processing for not allowing the file to be operated by another user is performed. In addition, by storing the information about the folder of the movement destination, another user can recognize to where the file is about to be moved.

When creating the lock file and arranging the created lock file is completed, the operation proceeds to step S0604. In step S0604, the file operation unit 0402 of the document management application 0400 starts moving the file. Movement processing for moving a file varies according to whether the file is to be moved within one repository (one database) or moved to a different repository (a different database). When the file is to be moved within one repository, storage location information of the file is changed by rewriting the path of the stored file, so that movement is accomplished. When the file is to be moved to a different repository, movement processing is executed in the following procedure. First, a selected file is temporarily stored into the HDD 0207 used by the document management application 0400, and the stored file is copied from the HDD 0207 to a folder of a movement destination. Subsequently, the file stored in the movement origin and the file stored in the HDD 0207 are both deleted.

When the movement of the file by the file operation unit 0402 is completed, the operation proceeds to step S0605. In step S0605, the exclusion processing generation unit 0406 of the document management application 0400 deletes the corresponding lock file. In other words, the exclusion processing is canceled by deleting the lock file.

In a case where presence of a lock file is determined (YES in step S0602), the operation proceeds to step S0606. In step S0606, the document management application 0400 reads the content of the lock file. Then, in step S0607, the document management application 0400 determines whether the movement destination is written. In other words, the document management application 0400 determines whether information about a folder of the movement destination is stored. In this process, the document management application 0400 reads the content of the lock file in a state that allows the lock file to be deleted even in the middle of reference to the lock file by the document management application 0400 running in another information processing apparatus. This allows deletion in step S0605 after completion of the movement.

Figure 7:
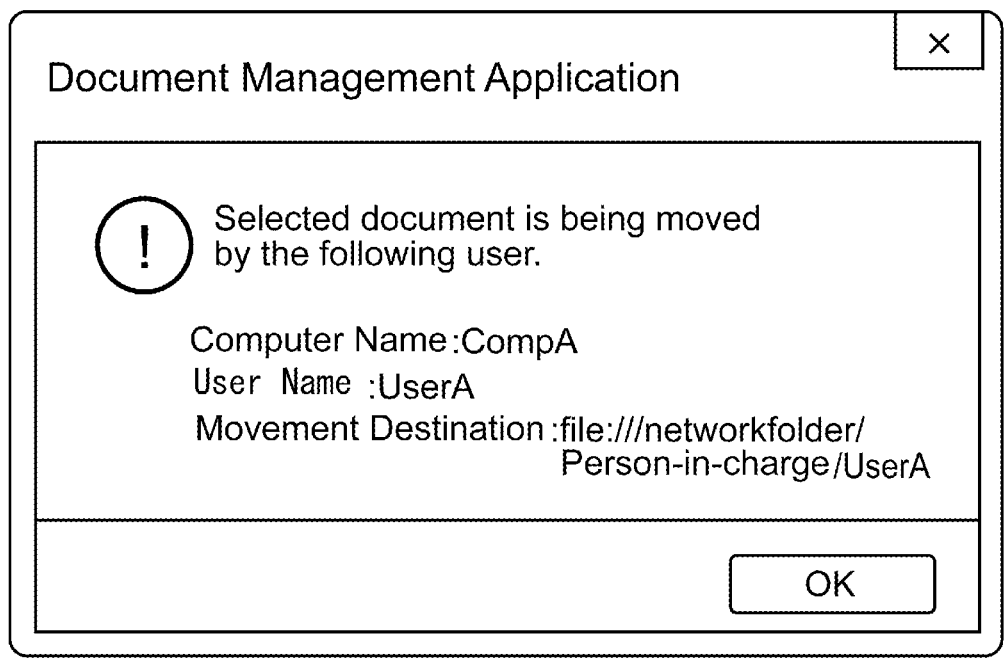
FIG. 7 is a diagram illustrating an example of a UI of a message box to be displayed when movement processing conflicts with another movement processing for one file.

In a case where no movement destination is written (NO in step S0607), it is determined that the lock file is created with an operation (an edit operation) other than movement execution, and the operation proceeds to step S0609. In step S0609, a message is displayed to notify that the file is being edited by another user. In a case where the movement destination is written (YES in step S0607), it is determined that the lock file is created with movement execution, and the operation proceeds to step S0608. In step S0608, a machine name, a user name, and a movement destination written in the lock file are read, and then a message including these read pieces of information and indicating that the file is being moved is displayed. In the present exemplary embodiment, a notification message is displayed so that it is possible to recognize to where the file is moved by a user of which computer. FIG. 7 illustrates an example of a message box displayed in this process.

As described above, even if a failure occurs in movement processing for moving a file due to a conflict with a movement operation by another user, a user can readily recognize who has moved the file to where, immediately after providing an instruction for a movement operation. Therefore, the user can continue work, without having such a misunderstanding that the file to be moved is lost.

Next, a second exemplary embodiment of the present invention will be described. In the first exemplary embodiment, path information of the movement destination, which is included in the message displayed in step S0608 in FIG. 6, corresponds to path information written in the lock file in step S0603 by the document management application 0400 of another information processing apparatus. For this path information of the movement destination, path information displayed in the address bar 0502 of the document management application 0400 may be used. This path information indicates the location of a file in the document management server 0103, and varies according to the registration state in each information processing apparatus. For example, an OS of an information processing apparatus can display the path of a document management server by mounting the path as a network drive. For example, in a case where a \\server\folder is mounted as a drive Z of an information processing apparatus, path information such as \\server\folder\UserA is handled by being replaced with Z:\UserA, in the information processing apparatus. Therefore, in a case where this Z:\UserA is written to a lock file, it is difficult to recognize which location is indicated by this path, even if this path is displayed, in another information processing apparatus. In the second exemplary embodiment, with reference to FIG. 8, there will be described a method for writing such path information to a lock file after replacing this path information with path information that can be recognized when referred to in another information processing apparatus. Other configurations are similar to the configurations described in the first exemplary embodiment and therefore will not be described.

Figure 6:
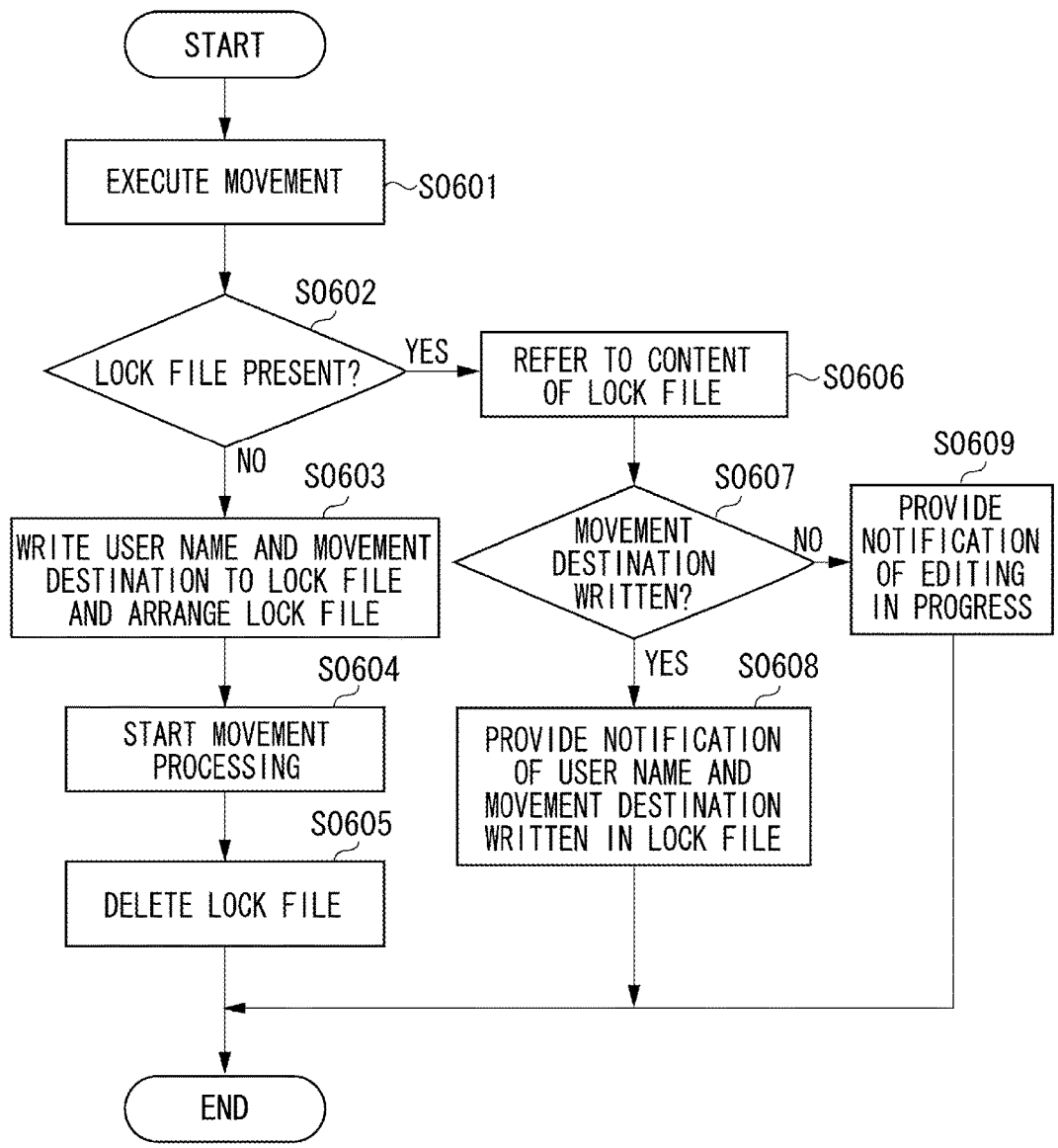
FIG. 6 is a flowchart illustrating a method for confirming whether movement execution is performed also from another information processing apparatus for one file.
Figure 8:
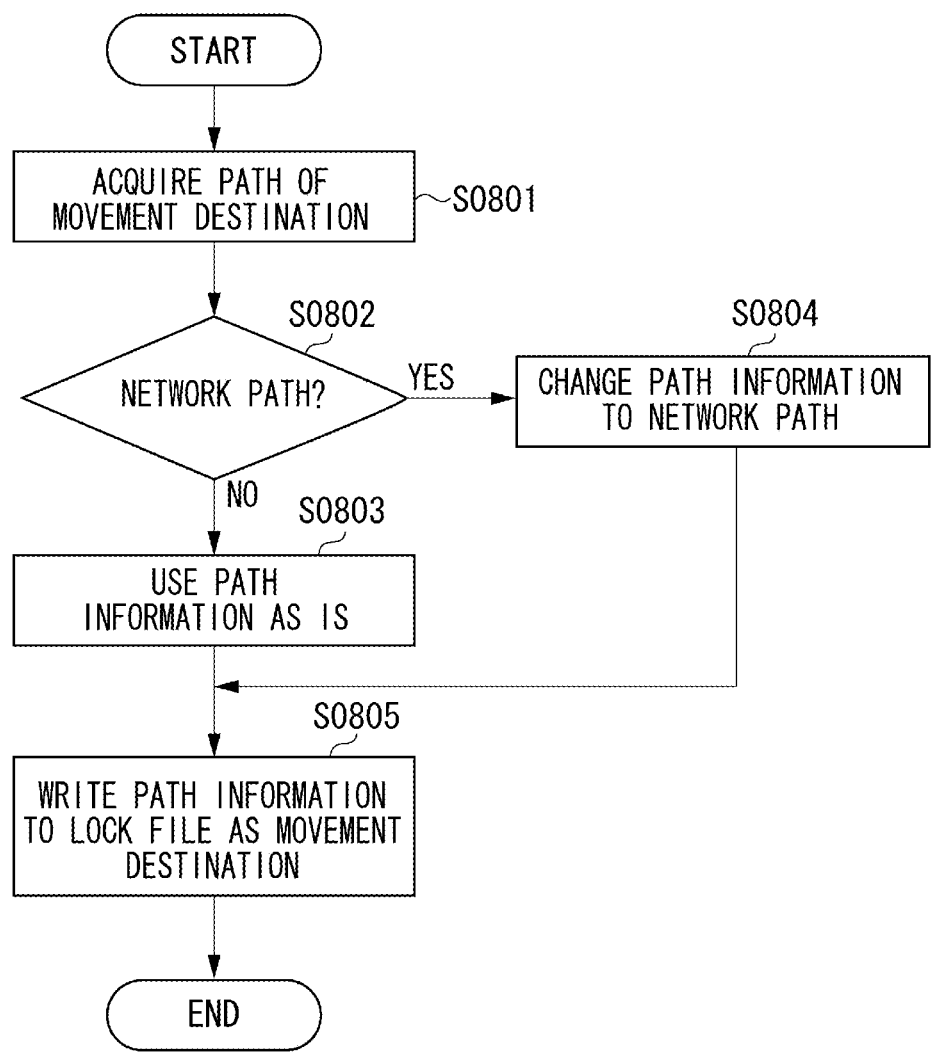
FIG. 8 is a flowchart illustrating a method for converting path information.

As preprocessing to be performed before writing the movement destination in step S0603 of FIG. 6, replacement of path information is performed by executing processing in a flowchart of FIG. 8. In step S0801, the document management application 0400 acquires the path of a movement destination. In step S0802, the document management application 0400 determines whether to replace a drive name included in the path of the movement destination, with a network path (a path on a network). This determination is performed by acquiring a drive name included in the acquired path, and confirming whether the acquired drive name is handled as a network resource. In a case where the acquired drive name is handled as a network resource, a network path corresponding to this drive name can be acquired. Therefore, in a case where the document management application 0400 determines that the drive name is to be replaced with a network path (YES in step S0802), then in step S0804, the drive name in the path acquired in step S0801 is replaced with the acquired network path.

In a case where the acquired drive name is not handled as a network resource, i.e., in a case where the document management application 0400 determines that the drive name is not to be replaced with a network path (NO in step S0802), the operation proceeds to step S0803. In step S0803, the path information is used as is. In step S0805, the document management application 0400 writes the path information to the lock file. Therefore, the movement destination can be displayed with the network path, when providing an error notification in step S0608 in FIG. 6.

Figure 9:
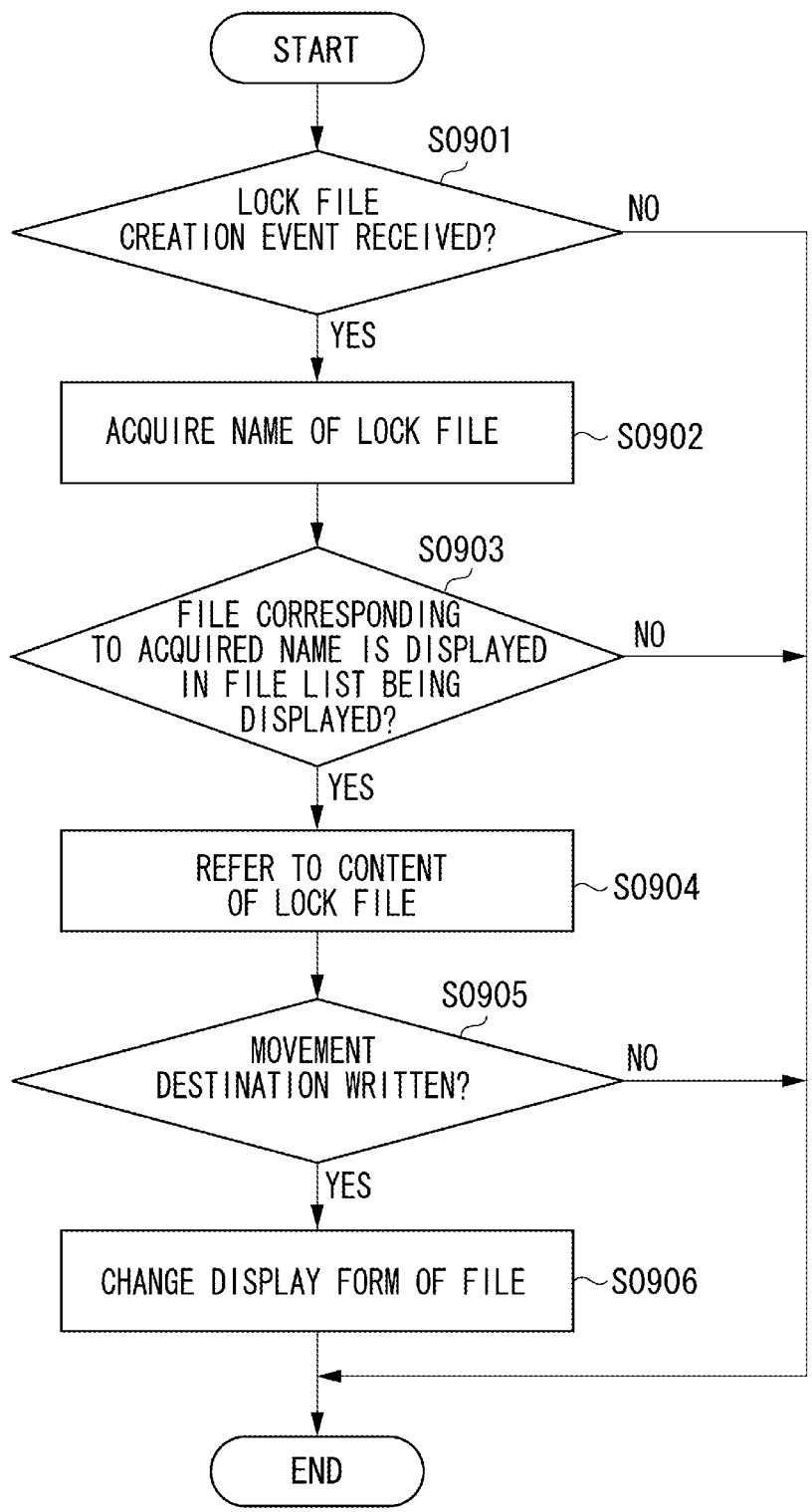
FIG. 9 is a flowchart illustrating a method for providing a notification of a movement destination of a file in a list being displayed.

Next, a third exemplary embodiment of the present invention will be described. In a state where a file list is displayed in the file list view 0505 by the document management application 0400, in a case where another information processing apparatus deletes a file (e.g., the document file 0506), this file is deleted from the file list. In this phenomenon as well, the file appears to be lost. In some cases, it is desirable that the document management application 0400 recognizes who has moved the file in the list to where. In the present exemplary embodiment, an example of a way of displaying a file, which is supposed to disappear from the file list view 0505 due to movement, will be described with reference to FIG. 9.

In step S0901, the document management application 0400 determines whether an event received from the document management server 0103 is an event notification indicating that a lock file is stored by an operation of another information processing apparatus, into a folder being displayed in the file list view 0505 (i.e., indicating that a lock file is created).

In a case where the document management application 0400 determines that the received event is an event indicating that a lock file is created (YES in step S0901), the operation proceeds to step S0902. In step S0902, the document management application 0400 acquires the name of the lock file. The document management application 0400 then acquires the name of a document file from the acquired name of the lock file. In the present exemplary embodiment, a lock file has a name formed by adding ".~lock" to the file name of a document, and therefore, the file name of an applicable file can be acquired by deleting ".~lock" from the acquired name of the lock file. However, this is only an example, and how to acquire the file name is not limited to this example.

In step S0903, the document management application 0400 determines whether the file having the acquired file name is displayed in a file list being displayed in the file list view 0505. In a case where the document management application 0400 determines that the file having the acquired file name is displayed in the file list being displayed (YES in step S0903), the operation proceeds to step S0904. In step S0904, the document management application 0400 refers to the content of the lock file.

Figure 10:
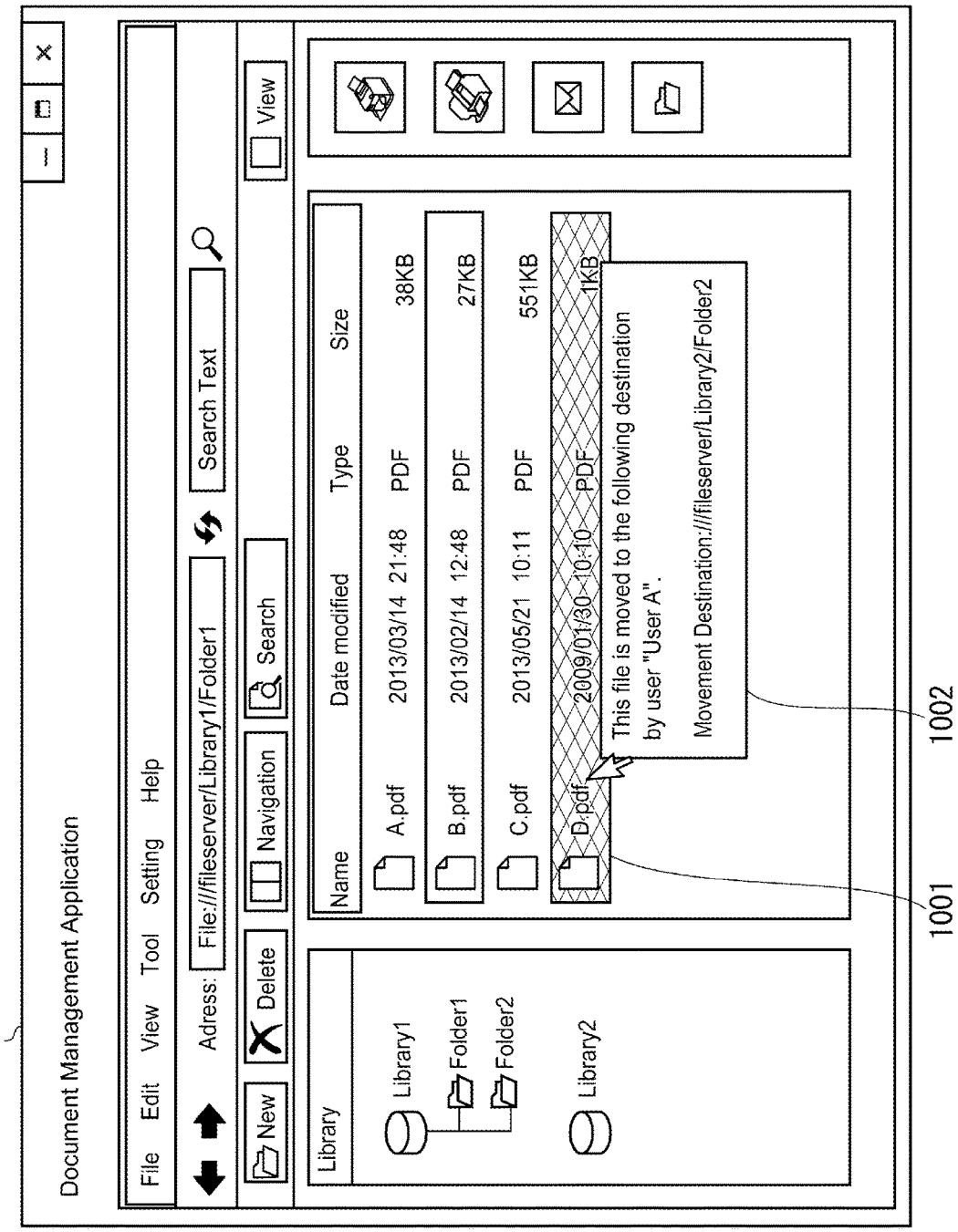
FIG. 10 is a diagram illustrating an example of a UI to be displayed when a file in a list being displayed is moved.

In step S0905, the document management application 0400 determines whether a movement destination is written in the lock file. In a case where the document management application 0400 determines that a movement destination is written in the lock file (YES in step S0905), the operation proceeds to step S0906. In step S0906, the document management application 0400 changes a display form of the applicable file. FIG. 10 is a diagram illustrating an example of a UI, in which display of the applicable file is changed to a shading state. A shading display expression 1001 is provided to indicate a moved file among files in the list being displayed. When the applicable file is mouseovered, a notification of a movement destination appears. A tooltip 1002 is a notification expression for providing a notification as to who has moved a file to where. The expression form is, however, not limited to this example. Further, by updating folder display or moving a folder being displayed, the list is refreshed for shifting from the shading display, so that the list appears in the latest state in which the applicable file is excluded from the list.

Accordingly, a user can readily confirm that a file in the list being displayed has been moved by an operation in another information processing apparatus.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-246338, filed Dec. 4, 2014, which is hereby incorporated by reference herein in its entirety.

What is claimed is:

1. An information processing apparatus comprising:
a memory; and
at least one processor in communication with the memory, wherein the at least one processor performs a process which comprises:
detecting provision of a movement instruction for moving a file stored in a first folder to a second folder;
determining whether exclusion processing is already performed for the file;
in a case where it is determined that the exclusion processing is not performed for the file, performing the exclusion processing for not allowing the file to be operated by another user and storing first information indicating that the file is being moved;
moving the file to the second folder in a case where it is determined that the exclusion processing is not performed for the file;
canceling the exclusion processing for the file after the file is moved to the second folder; and
notifying that the file is being moved, in a case where it is determined that the exclusion processing has been performed for the file and when the first information is stored for the file for which the exclusion processing has been performed.

2. The information processing apparatus according to claim 1, wherein the first information includes information that is about the second folder and indicates a movement destination of the file, and
wherein the notifying provides, in a case where it is determined that the exclusion processing has been performed for the file and when the first information is stored for the file for which the exclusion processing has been performed, a notification of the information indicating the movement destination where the file is stored.

3. The information processing apparatus according to claim 1, wherein the first information includes information that is about the second folder and indicates a movement destination of the file, and information about a user providing the movement instruction, and
wherein the notifying provides, in a case where it is determined that the exclusion processing has been performed for the file and when the first information is stored for the file for which the exclusion processing has been performed, a notification of the information indicating the movement destination where the file is stored and the information about the user providing the movement instruction.

4. The information processing apparatus according to claim 1, wherein it is notified that the file is being edited, in a case where it is determined that the exclusion processing has been performed for the file and when the first information indicating that the file for which the exclusion processing has been performed is being moved is not stored.

5. The information processing apparatus according to claim 1, wherein the determining determines whether the exclusion processing is already performed for the file, based on whether an exclusion processing determination file corresponding to the file is stored, and wherein, in a case where it is determined that the exclusion processing is not performed for the file, the exclusion processing is performed for not allowing the file to be operated by another user and the exclusion processing determination file describing the first information is stored in the first folder.

6. The information processing apparatus according to claim 5, wherein the process further comprising:

displaying a list of files included in the first folder; and changing, when the list of files included in the first folder is displayed and in a case of receiving an event notification of storage of an exclusion processing determination file in the first folder, a display form of a file corresponding to the stored exclusion processing determination file.

7. The information processing apparatus according to claim 1, wherein, in a case where the first information includes a drive name of a network drive, information that is about the second folder and is obtained by replacing the drive name with a path on a network, is stored as the first information.

8. A non-transitory computer-readable medium storing a program for controlling a computer to perform a process which comprises:

detecting provision of a movement instruction for moving a file stored in a first folder to a second folder;

determining whether exclusion processing is already performed for the file;

performing, in a case where it is determined that the exclusion processing is not performed for the file, the exclusion processing for not allowing the file to be operated by another user, and storing first information indicating that the file is being moved;

moving, in a case where it is determined that the exclusion processing is not performed for the file, the file to the second folder;

canceling, after the file is moved to the second folder, the exclusion processing for the file; and notifying that the file is being moved, in a case where it is determined that the exclusion processing has been performed for the file and when the first information is stored for the file for which the exclusion processing has been performed.

9. An information processing method for being executed by an information processing apparatus, the method comprising:

detecting provision of a movement instruction for moving a file stored in a first folder to a second folder;

first determining whether exclusion processing is already performed for the file;

performing, in a case where the first determining determines that the exclusion processing is not performed for the file, the exclusion processing for not allowing the file to be operated by another user, and storing first information indicating that the file is being moved;

moving, in a case where the first determining determines that the exclusion processing is not performed for the file, the file to the second folder;

canceling, after the moving moves the file to the second folder, the exclusion processing for the file; and notifying that the file is being moved, in a case where the first determining determines that the exclusion processing has been performed for the file and when the first information is stored for the file for which the exclusion processing has been performed.

* * * * *